Sept. 15, 1931.　　　J. R. REPLOGLE　　　1,823,004
REFRIGERATING UNIT
Original Filed June 6, 1921　　5 Sheets-Sheet 1

Sept. 15, 1931.  J. R. REPLOGLE  1,823,004
REFRIGERATING UNIT
Original Filed June 6, 1921  5 Sheets-Sheet 3

Inventor
John R. Replogle
By Hart & Lind
Attorneys

Sept. 15, 1931.    J. R. REPLOGLE    1,823,004
REFRIGERATING UNIT
Original Filed June 6, 1921    5 Sheets-Sheet 4

Inventor
John R. Replogle
By Hart & Lind
Attorneys

Patented Sept. 15, 1931

1,823,004

UNITED STATES PATENT OFFICE

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN

REFRIGERATING UNIT

Original application filed June 6, 1921, Serial No. 475,344, and in Canada February 11, 1922. Divided and this application filed June 10, 1927. Serial No. 197,943.

This invention relates to refrigeration apparatus and to such devices as are adapted to maintain comparatively low temperatures in cold storage rooms, or chambers in refrigerators, or in any enclosed space where such a condition is desired, the present application being a division of my copending application Serial No. 475,344, filed June 6, 1921.

An object of this invention is to provide a device of the character referred to, which is highly compact, which can be transported from place to place as a unitary structure, can be easily installed in any enclosed space and will efficiently maintain in that space a suitable low temperature.

Another object of the invention is to provide a device which will mechanically agitate, circulate, and thoroughly mix at frequent intervals, the air in an enclosed space.

Another object of the invention is the provision of a highly compact motor-compressor-condenser-vaporizer unit for refrigeration purposes.

Another object of the invention is to provide a highly efficient means for automatically maintaining a cool atmosphere in an enclosed space.

A further object of the invention is to provide a motor driven refrigerating apparatus adapted to cool the air of enclosed spaces and which has improved means for automatically controlling the operation of the apparatus in order to maintain the air at a desired low temperature.

Another object of the invention is to provide a refrigeration unit comprising a vaporizer of improved construction and arrangement of parts.

Other objects more or less incidental or ancillary to the foregoing will appear to those skilled in the art from an examination of the following description taken in connection with the accompanying drawings.

In cold storage rooms, and more especially in cold storage rooms of retail stores, meat shops, oyster houses and the like, ice has been commonly employed, heretofore, as the cooling agent, or means for reducing and maintaining a comparatively low temperature therein. But ice as a cooling agent is unsatisfactory for various reasons. It is costly, troublesome, inefficient and unsanitary, and is also objectionable because of the large space and equipment necessary for its utilization. It is almost impossible to regulate the temperature of an enclosed space that is cooled by means of natural or artificial ice. Moreover, in extremely hot weather, it is not an infrequent occurrence for all the ice in the ice receptacle to melt before it can be replenished, thus causing deterioration and loss of articles that have been placed within the cooling or refrigerating space.

In large refrigerating spaces or rooms it has been found to be less expensive and more satisfactory in every way to install machinery to mechanically maintain those spaces or rooms at the required low temperature. But, heretofore, such machinery has been too expensive in its original cost, and in its cost of installation and operation, to be employed in other than large rooms or spaces. Moreover, replacements and repairs in and for such devices require the presence and services of an expert.

These and other disadvantages are overcome by the device herein disclosed which consists of a comparatively small portable unitary refrigerating unit that may be installed by any ordinary workman and when installed it will automatically maintain the cooling room or enclosure at a predetermined low temperature without the services of an operator or attendant. This device is especially adapted for cooling rooms or enclosures of comparatively large dimensions. In other words, the device is primarily intended for the use of merchants and dealers engaged in the retail trade.

My improved unit consists essentially in a gas liquefying means 1, a vaporizer 2 or heat absorbing means, and a sheet metal enclosing casing 3. The gas liquefying means consists in a motor 4 which operates a compressor located within the casing 5, and a water cooled condenser indicated at 6. This gas liquefying means 1 is operatively connected with the vaporizer 2 to form a closed refrigeration system. The vaporizer consists of an expansion chamber or header 7 with depending refrigerant circulating tubes 8 having heat absorbing plates or fins 8a attached thereto. The casing 3 is designed to enclose the refrigeration system and is adapted to be placed in a cooling room or any enclosed space where a low temperature is desired.

In order that the atmosphere in all parts of the cooling room shall be maintained at a uniform constant temperature, a fan for agitating and circulating the air is provided. This fan is so arranged that it directs the air across the vaporizer whereby the air is cooled. It is not necessary, however, that the fan be run continuously in order to maintain the room at a predetermined temperature. A thermostat is provided for automatically starting and stopping the fan in order to maintain the room at the required temperature.

Figure 1:
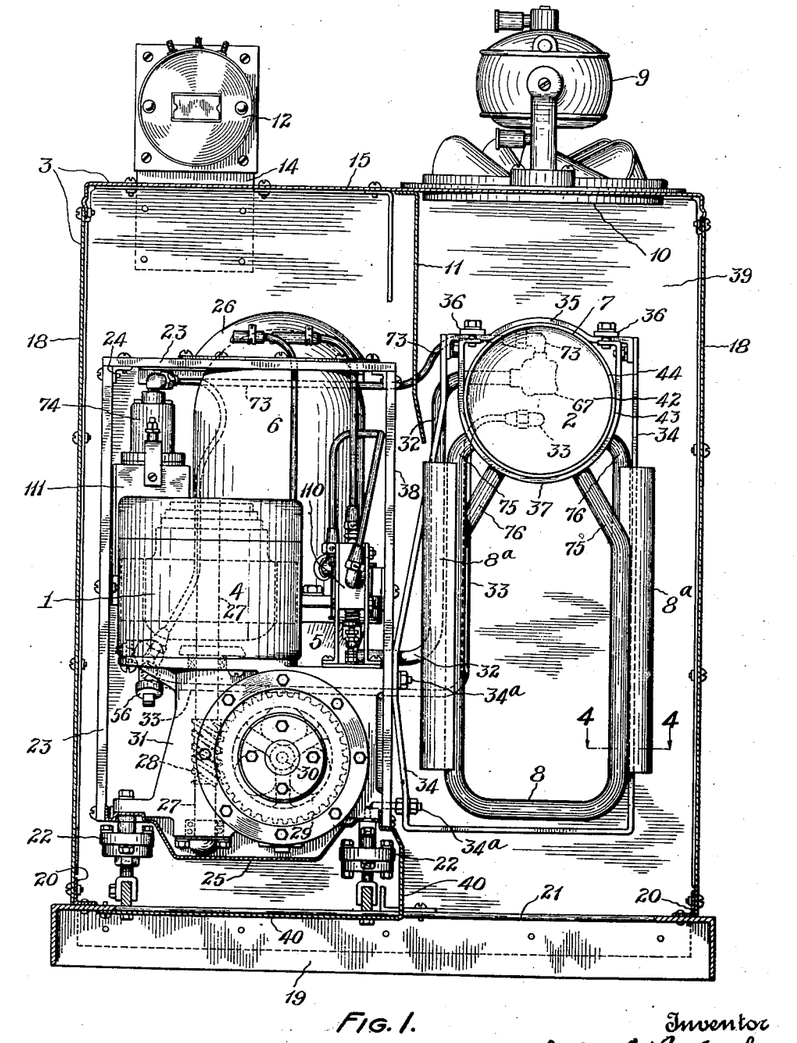
Fig. 1 is a front elevation of my refrigerating unit, the enclosing casing therefor being shown in section.

As shown in Fig. 1, the electric fan 9 is mounted on the casing 3 directly above the air inlet opening 10, (see Figs. 1 and 4) in the top wall of the casing 3 in any suitable manner. A deflector 11 directs the air across the vaporizer.

Thermally operated means are employed to control the operation of the fan. As shown, a thermostat 12 is mounted in any convenient manner either on the casing 3 or at any convenient point within the enclosure in which the unit is employed. As shown in Fig. 1, a plate 14 is attached to one side wall of the casing and extends above the same to which is attached the thermostat. The thermostat is arranged to open and close the switch for operating the electric fan. The thermostat may be adjusted in the usual manner to operate at any desirable predetermined temperatures. Since the details of the thermostat constitute no part of my invention, those details are not herein described.

The sheet metal casing 3 is formed with top, front, back and end walls 15, 16, 17 and 18 respectively, which are secured together in any suitable manner as by means of the bolts, so that one or more sides may be readily removed to permit access to the interior thereof. This casing is secured to the base member 19 by means of suitable angle bars 20. As shown, the base member is provided with the air outlet opening 21 to permit cool air, from around the vaporizer, to escape to the outside room or enclosure so as to cool the same.

Enclosed within this casing, as for example at the left side thereof and resting on the base member 19 is the gas liquefying means or motor-compressor-condenser unit 1. This unit is provided with suitable flexible supports 22 so as to minimize the effect of any vibration of the working parts. In order to prevent any noise made by the motor-compressor-condenser unit 1 from being heard and to prevent undue heat transfer, this unit is isolated from the vaporizer 2 by means of the housing 23. This housing may be made of any suitable material, preferably of heat insulating material, and the walls are connected together in any suitable manner as by means of the brackets 24. The bottom wall of this housing is formed from sheet metal bent to proper form to constitute an oil receptacle or pan 25. In order to conserve material, the top wall of this housing 23 may be provided with an aperture through which the upper portion of the condenser 6 may extend. This aperture is closed by a plate 26.

The motor-compressor-condenser unit 1 comprises a motor 4 the armature of which is mounted on a vertical shaft 27 which carries a worm 28 which meshes with a worm wheel 29 keyed to the extended end 30 of the crankshaft of a compressor located within the casing 5. The water cooled condenser 6 is secured to the discharge end of this compressor 5. A casing 31 is provided for enclosing the gearing, just described, that transmits the power from the motor to the compressor.

The compressor is adapted to receive vaporized refrigerant through its suction inlet, compress the vapor and discharge it into the condenser where the combined pressure and cooling liquefy it. The suction side of the compressor is connected by a conduit 32 with the vapor space of the vaporizer 2. The discharge port of the condenser is connected by a conduit 33 to the refrigerant inlet of the said vaporizer, said conduit being adapted to conduct liquid refrigerant to the vaporizer from the condenser. Any suitable refrigerant can be employed in so far as some features of the invention are concerned; but I prefer to use sulphur dioxide ($SO_2$).

The details of the compressor and condenser construction have not been set forth because the compressor and condenser, in so far as the present invention is concerned, may have any construction adapted to perform the compressor and condenser functions. However, the details of the compressor and condenser are fully disclosed in my said application Serial No. 475,344 to which reference can be made if desired.

The evaporator or vaporizer 2 is supported at one side of and exterior of the housing 23 by any suitable means such as the U-shaped supports 34 which are detachably mounted on the gear casing 31 and compressor casing 5 by means of the bolts 34a. The ends of the supports extend upwardly and are detachably secured to the downwardly extending ends of saddles 35 which engage the upper surface of the header or vaporizer chamber 7. Bars 36 are supported on the saddles 35 at each side of the chamber 7. Secured to the bars 36 at each end thereof are loops 37 which engage beneath the chamber 7 at each end thereof to support the same.

It will be noted that deflector or air guiding plate 11 and the side wall 38 of the housing 23 nearest the vaporizer form one side wall of a cooling chamber 39. The remaining walls of this chamber are formed by the top wall 15, the front wall 16, the back wall 17 and the end wall 18 of the casing 3 which encloses the entire unit. The vaporizer is supported within this chamber 39 and the air inlet opening 10 of the casing 3 is arranged directly over the vaporizer. Also, it will be noted that I have provided an additional wall 40 which is a continuation of the side wall 38 of the housing 23 and extends downwardly and underneath the housing to provide an additional means for preventing the cool air from coming into contact with the bottom portion of the motor-compressor-condenser unit 1. The refrigerant circulating tubes and heat absorbing fins 8a transversely fill practically the entire side and bottom space of the cooling chamber thus providing a maximum amount of heat absorbing surfaces for the warm air entering through the opening 10.

The vaporizer includes a vaporizer chamber or header, an inlet valve, a float for controlling the same so that a body of liquid refrigerant is maintained in the vaporizer, and tubes bent to form loops and attached at both their ends to the said header so that the liquid refrigerant may circulate therethrough.

The front end of the vaporizer chamber 7 (see Fig. 3) is provided with an inwardly extending bead 41. A concave reentrant end wall member 42 of sheet metal has its peripheral portion flanged to conform to the inner periphery of the sheet metal body portion or side wall 43 of the chamber and is inserted against the bead 41 with the convex surface extending inwardly. The forward edge 44 of the body portion or side wall of the chamber is then bent inwardly over the flange of the end wall to secure the same in position. The parts may then be suitably soldered. This arrangement permits the use of sheet metal head and side walls and at the same time provides a head well adapted to resist internal pressure without leaking or giving way. Also, it is to be noted that the reentrant form of the end wall has the effect of reducing the interior space of the header without reducing the length of the side wall surface available for attaching the circulating tubes, as is obvious from the fact that the transverse sectional area of the header on a plane bounding the last circulating tube at the front end of the header (the right end as viewed in Fig. 3) is annular in form and much less than the transverse areas on planes to the left of the reentrant end wall.

The rear end of the chamber is provided with a head or end wall 45 having the annular peripheral groove 46 in which is secured the rear end of the cylindrical body portion or side wall 43 of the chamber 7. The head 45 is provided with an aperture 47. The head 45 is provided with an annular groove 48 extending about the aperture 47. This groove is rectangular in cross section and has seated therein an annular gasket 49 of suitable soft material, as lead, of the same width as the groove but of slightly greater thickness than the depth of said groove. A removable closure 50 provided with an inwardly extending boss 51 fitting within said aperture 47 and provided also with a flange 52 overlying said gasket is adapted to be secured to said head by screws 53 which engage said flange. The clamping of the closure against the head causes the material of the gasket to flow and effectively seal the joint between the head and closure at each side of the gasket.

The closure 50 has an inwardly projecting member 54 secured thereto which is provided with an inlet opening 55, in the outer end of which is secured the upper end of the liquid refrigerant conduit 33 the lower end of which is in communication with the condenser chamber 6 through a suitable charging valve 56 (see Fig. 1). A strainer 57 located within the opening 55 is secured to the end of the conduit 33. The member 54 is provided with a port 58 through which liquid refrigerant is adapted to pass from the conduit 33 into the chamber 7. The port 58 is closed by the ball valve 59 which is opened by the differential pressure. A spring 60 carried by the float lever 61 holds the valve in such proximity to its seat that when the compressor is not operating the raising of the float due to the elevation of the liquid level in the chamber 7 will close the same. Moreover, the spring will prevent injury to the valve while the device is being moved or shipped. The float lever is pivoted to the member 54 at 62 and is limited in its movement by the pin 63 which engages in a notch 64 in the said lever. The lever 61 is operated by the float 65 as disclosed in my Letters Patent No. 1,615,406. The liquid refrigerant containing more or less lubricant in solution therewith is forced into the chamber 7 and as the refrigerant vaporizes and is withdrawn the lubricant being lighter than the refrigerant floats thereon. The float is so constructed that it floats at the intersection of the two liquids as clearly shown in Fig. 3 of the drawings.

Figure 2:
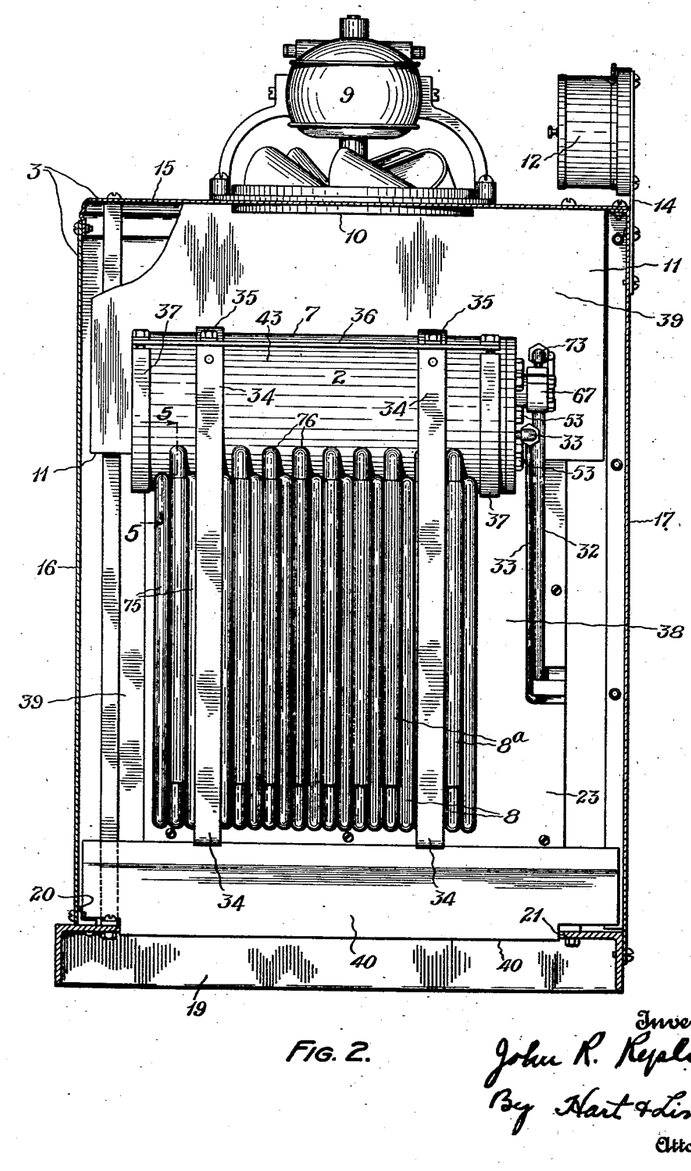
Fig. 2 is a side elevation of the device, also showing the enclosing casing in section.
Figures 3, 4, 5, 10:
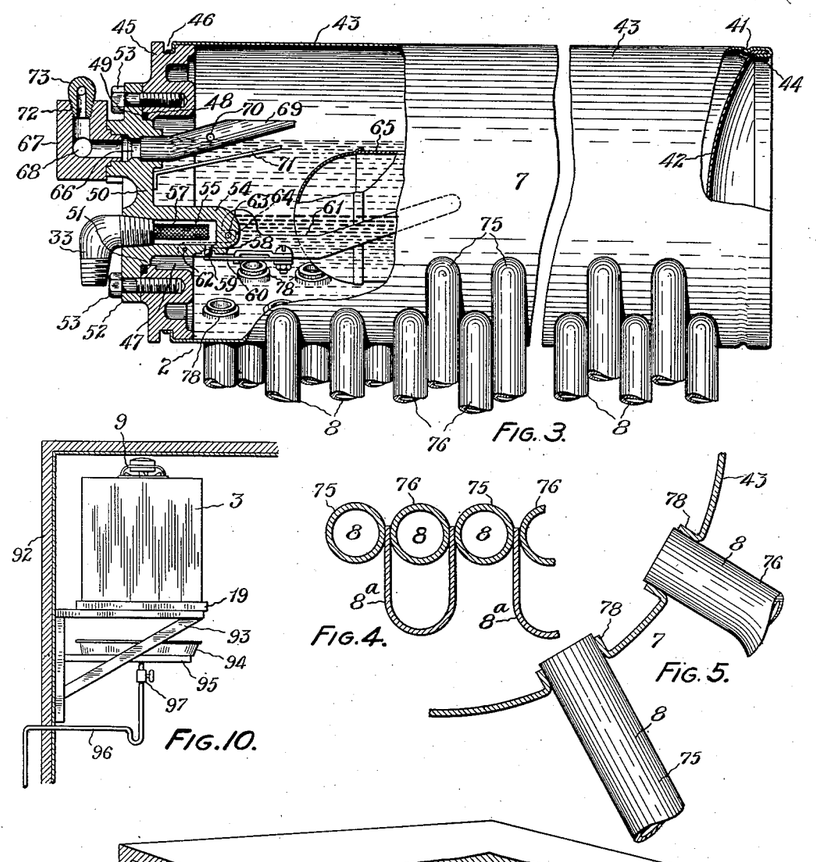
Fig. 3 is a side elevation of the expansion chamber, some of the parts being broken away, and others in section.
Fig. 4 is an enlarged detail section taken on line 4—4 of Fig. 1 showing the arrangement of heat absorbing fins with respect to the refrigerant circulating tubes.
Fig. 5 is an enlarged detail sectional view taken on line 5—5 of Fig. 2, showing the manner of attaching the refrigerant circulating tubes to the expansion chamber.
Fig. 10 is a side elevation, some of the parts shown in section and some broken away, of a cooling room with a cooling unit shown in position therein.

The closure 50 is provided with an outlet 66 (see Figs. 1, 2 and 3). A plate or block 67 is secured over the outlet 66. The block 67 is provided with a laterally extending aperture 68 in communication with the outlet 66. A conduit 32 communicating with the aperture 68 at its upper end has its lower end in communication with the suction inlet of the compressor casing 5. The compressor draws the vaporous refrigerant into the casing 5 from the chamber 7 through this conduit 32 when the device is in operation. A tube 69 is secured in the outlet passage 66 and extends inwardly and upwardly within the chamber 7 and is provided with apertures 70 through which the oil, which is left behind by the vaporization of the refrigerant and floats on the same, overflows and finds its way back to the crank case through the conduit 32. A baffle plate 71 may be employed, if desired, to prevent liquid refrigerant being thrown into the tube 32 by the ebullition thereof. The cap or plate 67 is also provided with the aperture 72 which is in communication with the outlet port 66. A conduit 73 has one end secured in the aperture 72 and has its other end connected to the controller or switch control mechanism located in the casing 74.

In order to increase the heat conducting surface of the vaporizer, one or more pipes or expansion coils may be employed. These pipes may be of any shape or form and arranged in any suitable manner in so far as some aspects of the invention are concerned. However, in the preferred construction shown, the pipes or expansion coils 8 are arranged in two series of loops 75 and 76. In one series of pipes or expansion coils 75 each pipe or coil has one end secured in the bottom of the chamber at the left of the center thereof, and extending downwardly laterally and upwardly is secured in the right side of the chamber. In other series of pipes or expansion coils 76, each pipe or coil has one end secured in the bottom of the chamber 7 at the right thereof, and extending downwardly laterally and upwardly is secured in the left side of the chamber. The loops are arranged in parallel planes at right angles to the chamber. The pipes are arranged in this manner in order not to unnecessarily weaken the walls of the chamber 7 and also for the reason that this arrangement forms a space in which ice trays may be inserted, if desired, when the unit is employed in refrigerators. In order to further increase the heat conducting surface of the vaporizer, fins or sheet metal plates 8a may be arranged in any suitable manner, for instance, in the form of loops, as illustrated in Figs. 2 and 4 and attached as by soldering, to the pipes 75 and 76. Obviously the vertically disposed fins 8a facilitate convection circulation of the air cooled as well as increase the heat-conducting surface of the vaporizer.

In securing the pipes 75 and 76 in the chamber 7, the wall of said chamber is punched inwardly so that the inwardly extending portion or boss 78 about each hole (see Fig. 5) will afford an extended surface to which the ends of the pipes may be soldered, thus insuring permanency and rigidity of the connections.

While it is possible to make the sheet metal and tubular parts of the vaporizer of various metals, I prefer to use copper because, as is well known, it is easily worked and has high thermal conductivity.

The motor for operating the device is started and stopped automatically by suitable controlling mechanism. The controlling mechanism for this purpose is pressure operated. It is the usual practice in pressure controllers to employ a fluid thermostat for automatically starting and stopping the motor. I have found, however, that the employment of a thermostat for this purpose is unnecessary because by placing the controller in direct communication with the expansion chamber, the operation of the motor may be more efficiently controlled without a fluid thermostat than with one. In the present invention the switch controlling mechanism for starting and stopping the motor is operated directly by the pressure in the expansion chamber, and since the pressure in the expansion chamber increases as the internal temperature increases and vice versa it follows that the operation of the motor is controlled by the internal temperature. This is an important feature of my invention.

As shown, the conduit 73 communicates at one end with a pressure operated sylphon enclosed in the casing 74 which operates the controller switch for the motor enclosed within the casing 111, and communicates at its other end with the vapor space of the vaporizer 2. As the pressure increases within the vaporizer due to rising temperature, it is transferred to the sylphon by means of the conduit 73 and due to the operation of the sylphon mechanism, the motor switch is closed thereby starting the operation of the compressor. As the pressure falls within the vaporizer the sylphon mechanism will be operated in an opposite manner to open the motor switch and stop the operation of the compressor. The detail construction and operation of the sylphon control for the motor switch will not be disclosed in this application, as those details form no part of the invention herein claimed. A full disclosure is found in my copending application Serial No. 475,344 above referred to.

In the use of my improved apparatus as an air-cooling unit, the air of the enclosure to be cooled is usually maintained at a temperature above the freezing point of water and consequently when the air is circulated by the fan and comes in contact with the colder surfaces of the refrigerant vaporizer, moisture present in the air is condensed on the surfaces of the vaporizer and there frozen; or as it is usually expressed, the vaporizer becomes frosted. The frost or ice may thus form on the vaporizer to a considerable depth. However, as the mechanism of the switch operating device is so constructed and adjusted that the switch is opened at a substantially lower internal temperature of the vaporizer than the temperature at which it is closed, when the switch has been opened, and as the fan continues to circulate the air over the vaporizer, the latter is defrosted because the temperature of the air is above the freezing point of water and the vaporizer is abstracting less heat from the air while the compressor is not operating and the internal temperature of the vaporizer is gradually rising. The water formed by the melting frost or ice may be collected in a pan or receptacle from which it may be conducted to the sewer if it is desired to maintain the air in the enclosure dry. If, however, it is desirable that a normal amount of moisture be maintained in the air to prevent the drying out of certain foods, such as meats or the like, the water is left in the receptacle to be reabsorbed by the air.

In connection with the frosting and defrosting action above referred to, a peculiar advantage resides in the nature of the automatic control provided for the operation of the refrigerant compressor and the fan motor, respectively. In my system, the fluid pressure actuating device for operating the switch of the compressor motor is responsive to changes of temperature of the means for absorbing heat from the air to be cooled. In the preferred construction illustrated this heat-absorbing means consists, of course, of the vaporizer, with the walls of which the air comes in contact, and the switch-actuating device is responsive to the temperature not merely of the vaporizer structure but also and primarily of the refrigerant vapor in the vaporizer. This system of compressor control is peculiarly advantageous in connection with the cooling of the air because when the heat-absorbing device becomes frosted, as above described, the frost or ice coating is a very poor conductor of heat so that if, for example, the compressor control devices were made responsive to the air surrounding the heat absorbing means, the compressor might continue operating very much longer than should be necessary and at a lower vapor temperature than characterizes the operation of my apparatus under similar circumstances. Such operation at lower internal temperature would greatly reduce the efficiency and the capacity of the compressor mechanism as it results in a handling of a smaller mass of refrigerant vapor. With my system of control, on the other hand, the operation of the compressor responds directly and accurately to changes of temperature of the vaporizer itself so that the average refrigerant vapor temperature approaches, more nearly the temperature of the air to be cooled and the refrigeration apparatus operates with a maximum efficiency and at the same time the separately controlled motor of the air circulating fan insures a circulation of the air requisite to maintain the desired temperature in the space to be cooled.

While I prefer in many instances that the compressor, condenser and vaporizer be embodied in a unitary structure as above described, it is obvious that some of the main advantages of the invention can be realized if the compressor and condenser are installed in some suitable position more or less remote from the vaporizer or cooling element.

Figures 6, 8:
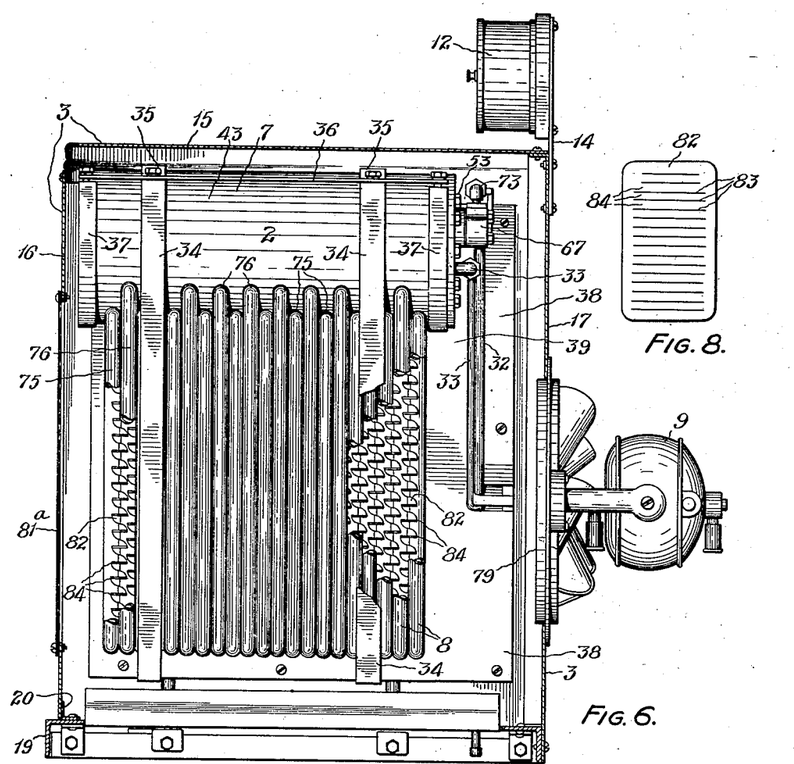
Fig. 6 is a side elevational view similar to Fig. 2 showing a modified form of the device.
Fig. 8 is an elevation of a blank from which the fins disclosed in Figs. 6 and 7 are formed.

The form of the device shown in Fig. 6 is substantially the same as that shown in Figs. 1 to 5 except for a different arrangement of the fan and a different form and arrangement of the heat conducting fins. In this form the fan 9 is mounted in an opening 79 in the rear wall of the casing 3 directly in rear of the vaporizer 2 so that it may direct a current of air along, through and about the vaporizer coils and out the opening 81a in the opposite side of the cooling chamber.

Figure 7:
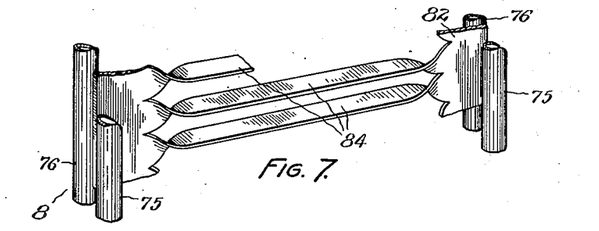
Fig. 7 is an enlarged detail view showing the arrangement of heat absorbing fins used in the modified form disclosed in Fig. 6.

In order to increase the heat conducting surface of the vaporizer, heat conducting members of any suitable form may be attached to the vaporizer in any convenient manner. As shown in Figs. 6 and 7, each U-shaped coil may be provided with a heat conducting plate 82 extending from one side of the coil to the other and provided with fins. The heat conducting plates 82 may each be made from a plate of sheet metal, by first slitting the same as at 83 to form the fins 84, then bending the fins at right angles to the main body portion of the plate as clearly shown in Fig. 7. By arranging the fins edgewise to the direction of the current they will offer a minimum amount of resistance to the passage of air through the vaporizer coils. As in the case of the first described form of vaporizer, the sheet metal and tubular parts of this last described form of vaporizer are preferably made of copper.

The form of the device shown in Fig. 6 is more economically and easily manufactured than the form shown in Figs. 1 to 5, because the fins are more easily made and applied. But it will depend on various conditions and circumstances which form of the device is better suited for use in any particular enclosure, such as the size and shape of the enclosure and the nature or character of the work to be done. For instance, where the device is employed in a cooling room designed for ice, the form of the device shown in Fig. 6 may be employed without making any change whatever in the room, except to provide water and electrical connections. It is only necessary to place the cooling unit on the floor of the ice compartment and make the necessary electrical and water connections. Such an arrangement is shown in Fig. 9.

Figure 9:
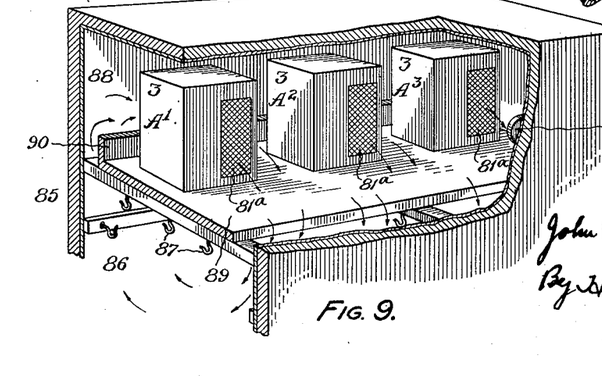
Fig. 9 is a perspective view, some of the parts being broken away and others in section, of a conventional cooling room employed in retail shops or stores with a plurality of my improved refrigerating units located therein.

In Fig. 9 is shown a usual or conventional cooling room employed in stores, shops and the like. The cooling room 85 is provided with the lower compartment 86 in which meat or other articles may be placed or suspended from the hooks 87, and the upper compartment 88 in which the ice is placed. The upper compartment is provided with a floor 89 which is narrower than the width of the room and is so located that there is a ventilating space between each side wall and the floor. A narrow vertical wall 90 rises from one edge of the floor and when ice is employed causes the natural circulation of air across the ice in the direction of the arrows, warmer air ascending on that side and the cooler air descending on the other.

In the application of my invention to the conventional ice refrigerator described above, in order to conserve space in the lower compartment, one or more cooling units may be placed in the ice compartment. As shown on the drawings, three units $A^1$, $A^2$, $A^3$, of the form shown in Fig. 6 are employed. They may be set on the floor 89 and are arranged with the fans adjacent to the wall 90 so that the circulation of the air will be in the same direction as when ice is employed. A single thermostat 91 for controlling the fans is secured to the cooling room wall in such a position that it is directly in front of one of the fans whereby it is more readily affected by the lowered temperature of the air forced across the vaporizer.

Figure 11:
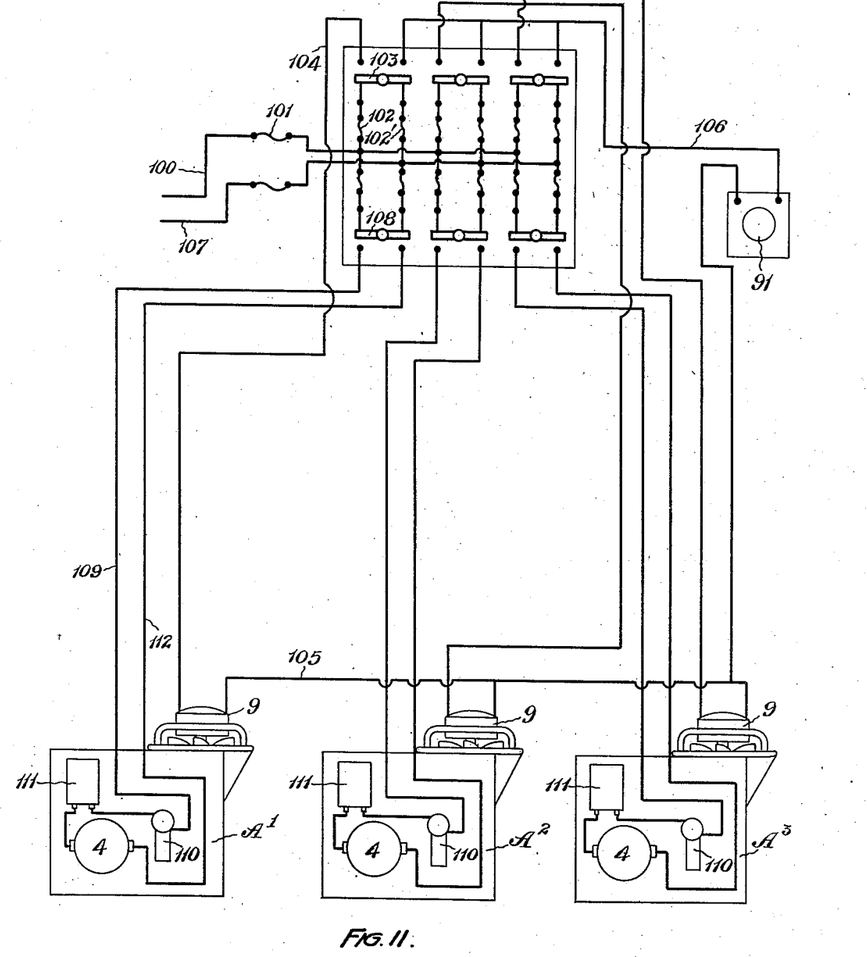
Fig. 11 is a wiring diagram for the units shown in Fig. 9.

Any suitable form of wiring may be employed. In Fig. 11 is shown a preferred wiring diagram for a plurality of units showing a separate fuse for each fan and each motor whereby each fan and each motor operates independently of the others. By this arrangement, should one unit get out of order it will not affect the operation of the others. Since the circuits of the three units are similar only one need be traced. The fan circuit for the unit $A^1$ may be traced as follows. The current enters through lead 100, fuse 101, passes through the fuse 102, switch 103 and conductor 104 to the fan 9, thence, through the conductor 105 to the thermostat 91. From the thermostat the current passes through the return wire 106, switch 103, fuse 102' and back to the lead 107.

The motor circuit for the same unit is traced as follows: The current enters through the lead 100 as before through the switch 108, and suitable fuses, thence through the conductor 109 to an electrically operated water valve 110, thence through the pressure operated controller switch 111 to the motor 4 and back to the lead 107 through the conductor 112, switch 108 and proper fuses.

In Fig. 10 is shown a section of a cooling room that is designed for mechanical coolers. It is similar to the room shown in Fig. 9 with the ice supporting floor 89 removed. One or more cooling units may be secured to one of the side walls 92 in any convenient manner. As shown on the drawing a bracket 93 is secured in an elevated position to one of the side walls 92, and a cooling unit is supported thereon. While the unit here shown has the fan supported on top of the same it is understood that the type shown in Fig. 6 may be employed, if desired. A pan or receptacle 94 is supported beneath the unit in any suitable manner as by the bracket or shelf 95. The receptacle 94 has a pipe 96 connected thereto. When the vaporizer is defrosted the water collects in the receptacle. If it is desirable to maintain the air in the cooling room extremely dry the valve or turn-cock 97 is left open and the water as it collects in the pan is discharged into the waste pipe 96. If, however, it is not desirable to remove the moisture from the air, the valve 97 is closed and the water collected in the receptacle will be reabsorbed by the air. The absorption is greatly facilitated by directing the air current on or over the water contained in said receptacle, as shown in Fig. 10.

The arrangement within a single casing, having oppositely arranged openings for the circulation of air therethrough, of a vaporizer in the line of these openings and a gas liquefying means thermally insulated from the said vaporizer, provides a highly compact and portable refrigerating unit which can be placed in any enclosed space and maintain in that space a low temperature.

In constructing my unit with a thermally insulated cooling chamber, and in arranging within this chamber the refrigerant circulating tubes with their heat absorbing fins so that they transversely fill practically the entire space within this chamber, I have provided a maximum amount of heat absorbing surfaces for the warm air entering the chamber. The detail construction of the heat absorbing fins and vaporizer loops, and their arrangement within the cooling chamber have not been claimed in this application.

In mounting the fan within one of the air openings in the casing for the unit, and in arranging a thermostat for controlling this fan within the cooling room and exteriorly of this unit casing, I have provided a structure which will automatically maintain a cool atmosphere in the cooling room.

In arranging the openings in the side wall of the header in separate series extending lengthwise of the said side wall, and having the openings of one series arranged in staggered relation to the openings of another series, I have provided a vaporizer having the maximum number of refrigerant circulating tubes and at the same time have not unnecessarily weakened the side wall of the header.

In constructing the removable end closure for the header so that it will support the connections for the refrigerant conduits, and also support the float valve mechanism, I have provided a header structure which can be easily taken apart and put together for the purpose of repair.

The concave reentrant end wall for the header, not only provides an adequately strong structure but also reduces the interior space of the header without reducing the wall surface available for the attachment of insulating tubes, thus providing a vaporizer with a large heat absorbing surface without having an unduly large interior space which must be filled with liquid refrigerant.

While I have shown and described in some detail the preferred construction and preferred arrangement of the parts, it will be understood that in all respects there can be wide variations without departing from the invention as defined in the appended claims.

What I claim as my invention is:

1. In refrigeration apparatus, a vaporizer comprising a header and a plurality of tubes connected thereto, the said tubes arranged in series extending lengthwise of the said header; each of the said tubes that form one of the said series having one of its ends connected to the bottom of the said header at the left of the center thereof, and extending downwardly, laterally and upwardly and having its other end connected to the right side of the said header; and each of the said tubes that form another of said series having one end thereof connected to the bottom of the said header at the right of the center thereof, and extending downwardly, laterally and upwardly and having its other end connected to the left side of the said header.

2. In a vaporizer for refrigerating apparatus, a chamber; tubes projecting alternately from the left and right side of the center of the bottom portion of the said chamber, throughout the length thereof; the said tubes which project from the bottom of the chamber at the left of the center thereof extending downwardly, laterally and upwardly and connecting at their opposite ends to the right hand side of the said chamber; and the tubes which project from the bottom of the chamber at the right of the center, extending downwardly, laterally and upwardly and connecting at their opposite ends to the left hand side of the said chamber.

3. In a refrigeration unit, a vaporizer comprising a header and depending tube loops arranged in series extending lengthwise of the header; one end of each of the tube loops of one of the said series connected to the bottom of the header at the left of the center thereof and having its other end connected to the side of the header at the right thereof; and one end of each of the tube loops that form the other of said series connected to the bottom of the header at the right of the center thereof, and having its other end connected to the side of the header at the left thereof.

4. In a vaporizer, a header adapted to contain refrigerant comprising a side wall and end walls, the said side wall having openings therein arranged in separate series extending lengthwise of the said header and comprising openings in one series staggered in relation to the opening of another series; and refrigerant circulating tubes having ends secured in the said openings.

5. In refrigeration apparatus, a vaporizer comprising a header, and a plurality of tubes of substantially identical non-symmetrical shape, said tubes being alternately reversely turned and having both ends connected to said header.

6. In refrigeration apparatus, a vaporizer comprising a header, and a plurality of tubes of substantially identical non-symmetrical shape, said tubes having their ends connected with and in open communication with said header, all of the tubes being relatively reversely turned and arranged in alignment longitudinally of said header.

7. In refrigeration apparatus, a vaporizer comprising a header, and a plurality of tubes connected to and in open communication with said header, said tubes being formed and associated with said header to induce refrigerant to travel in opposite directions through adjacent tubes.

8. In refrigeration apparatus, a vaporizer comprising a header, and a plurality of tubes extending from said header, said tubes being arranged in rows longitudinally of said header and the ends of adjacent tubes being secured to said header in staggered relation.

9. In refrigeration apparatus, a vaporizer comprising a header, and a plurality of tubes extending from said header, the ends of said tubes being secured to and arranged in a plurality of aligned rows on each side of said header.

10. In refrigeration apparatus, a vaporizer comprising a header, and a plurality of U-shaped tubes extending from said header, the ends of said tubes being secured to and arranged in a plurality of aligned rows on each side of said header.

11. In a vaporizer for refrigeration apparatus, a header comprising a sheet metal receptacle having a closed and an open end, an annular retaining ring disposed in the open end of the receptacle, said ring having an annular groove formed externally thereof, an inwardly extending flange formed around the open end of the aforesaid receptacle and projecting into said annular groove, a detachable closure for the open end of the receptacle, a float valve supported by the closure, and means for removably attaching the closure to the annular ring.

12. In a vaporizer for refrigeration apparatus, a header comprising a sheet metal receptacle having a closed and an open end, a closure for said opening having an annular groove formed externally thereof, means for securing the open end of the receptacle in said groove, and a float valve located in said header and carried by said closure.

13. In a refrigeration unit, a vaporizer comprising a header adapted to contain liquid refrigerant; tube loops connected at both ends to the said header in such a manner that the liquid refrigerant will circulate therethrough; and heat conducting fins on said tube loops.

14. A vaporizer comprising in combination, an elongated header; a plurality of loop-shape tubes each connected at both its ends to the sides of the said header and disposed in planes transverse to the header; and fins of sheet metal extending from the tubes in the planes of the loops to increase their effective heat-absorbing surfaces and promote circulation of air thereover.

15. In a refrigeration apparatus, a cooling chamber; a header located in the upper portion of the said chamber; tubes connected to the said header for the circulation of liquid refrigerant; heat absorbing fins secured to the said tubes; the said tubes and fins transversely occupying the greater portion of the width and bottom space of the said cooling chamber.

16. In an electric refrigerator, a cooling chamber containing refrigerating cooling means including a container, tubes each end of which open into the said container, and fins the sides of which are attached to said tubes, said tubes and fins transversely filling practically the entire side and bottom space of said cooling chamber.

17. In combination with a refrigerating unit, a refrigerating evaporating duct connected therewith adapted to be freely suspended in a body of air to be cooled, a vertically disposed cuprous heat absorbing plate disposed close and substantially parallel to said duct and in intimate thermal contact with said duct at a plurality of points along its length, whereby the heat absorption property of said duct is increased.

18. In combination with a refrigerating unit, a refrigerant evaporating duct connected therewith and arranged to facilitate a free downward circulation of air past it, a relatively wide and vertically disposed metal heat absorbing fin arranged parallel with and soldered to said duct to accentuate downward convection currents of the surrounding air, the absorption of heat therefrom and to increase evaporation of the refrigerant in the portion of said duct thermally united with said heat absorbing fin.

19. In a refrigerating apparatus, an elongated header adapted to contain refrigerant, a plurality of tubes of substantially loop shape connected in open communication with said header in such manner as to cause circulation of the refrigerant therein, said loop shape tubes being disposed in parallel planes transverse to said header, and a plurality of sheet metal heat absorbing members disposed parallel to said looped tubes, each of said members being secured in intimate thermal contact to both sides of the loop of one of said tubes.

20. In refrigerating apparatus, a vaporizer comprising a header adapted to contain a liquid, a plurality of pipe loops having their ends secured in open communication with said header, the two ends of each loop being disposed in relatively different horizontal planes and both below the level of the liquid in said header, and heat absorbing fins secured to said pipe loops.

21. In refrigerating apparatus, a vaporizer comprising a header adapted to contain a liquid, a plurality of tubes bent into the form of loops and each having both ends secured in open communication with said header below the level of the liquid contained therein, the lengths of the two portions of each of said tubes from the lowermost point thereof to the point of connection to the header being relatively different, and heat absorbing fins secured to said tubes.

22. In a refrigerant unit, an evaporator comprising a header adapted to contain refrigerant, a plurality of ducts disposed externally of said header and each having both ends connected in open communication with said header, said ducts being so arranged as to promote the circulation of refrigerant therethrough, and a plurality of vertically disposed metallic heat absorbing members secured to said ducts.

23. In a refrigerating unit, an evaporator comprising a header adapted to contain refrigerant, means for supplying refrigerant thereto in liquid form and for removing refrigerant therefrom in gaseous form, means for controlling the admission of liquid refrigerant to said header, a plurality of ducts having both ends in open communication with said header, one end of each of said ducts being connected to said header in a higher horizontal plane than the other end, and a plurality of vertically disposed metallic heat absorbing members secured to said ducts.

24. In a refrigerating unit, an evaporator comprising a header adapted to contain refrigerant, means for supplying refrigerant thereto in liquid form and for removing refrigerant therefrom in gaseous form, means for controlling the admission of liquid refrigerant to said header, a plurality of ducts having both ends in open communication with said header, one end of each of said ducts being connected to said header in a higher horizontal plane than the other end, at least the lower end of each of said ducts being disposed below the normal level of the refrigerant in said header, and a plurality of vertically disposed metallic heat absorbing members secured to said ducts.

25. In a refrigeration unit, a vaporizer disposed in the path of the circulating air in the interior of a refrigerated compartment, said vaporizer comprising a header adapted to contain refrigerant liquid, a tube loop connected at both ends to the header, and a heat conducting fin associated with one of the legs of the loop and extending into the circulating column of air for increasing the heat absorbing capacity of the vaporizer.

26. In a refrigeration unit, a vaporizer comprising a header adapted to contain refrigerant liquid, a tube loop connected at both ends to the header, and a heat conducting fin associated with one of the legs of the loop and projecting in a plane substantially in alignment with the legs of the loop for increasing the heat absorbing capacity thereof.

27. In a refrigeration unit, a vaporizer comprising a header adapted to contain refrigerant liquid, and non-symmetrical tube loops connected at both ends to the header, the legs of each of said tube loops having unequal capacities for the absorption of heat and adjacent tubes being reversely turned with respect to one another.

28. In refrigerating apparatus, a refrigerant expansion unit comprising a liquid refrigerant receiver, a plurality of aligned pipe loops connected in open communication with said receiver, said loops having spaced parallel legs, and fins arranged in rows secured in thermal contact with said loops, said fins in one row being staggered with respect to the fins in another.

29. In refrigerating apparatus, a refrigerant expansion unit comprising a receiver adapted to contain liquid refrigerant, unsymmetrical pipe loops arranged in aligned relation and secured with their ends in open communication with said receiver below the liquid refrigerant level therein, and heat absorbing means associated with the exterior of a similar portion of each pipe loop.

30. A refrigerant evaporating unit comprising a spaced pair of liquid refrigerant evaporating conduits, and a channel-shape fin secured in thermal contact with the conduits along the parallel opposite edges of the fin.

31. A refrigerant evaporating unit comprising a spaced pair of refrigerant liquid evaporating conduits, and a channel-shape fin secured to the adjacent edges of the spaced conduits, said channel-shape fin having portions thereof projecting outwardly a substantial distance beyond the limits of the evaporating conduits.

32. A refrigerant evaporating unit comprising a header having a plurality of spaced and aligned loops projecting therefrom, and a plurality of channel-shape fins secured between the loops in thermal contact therewith, said channel shape fins being provided with portions remote from the loops in planes intersecting the longitudinal axis of the header.

33. The combination with a refrigerator cooled by circulation of air internally thereof, of a refrigerant evaporating unit located therein in direct heat exchanging relation with such circulating air, said refrigerant evaporating unit comprising a spaced pair of continuous metallic walls arranged in parallel relation and forming side wall portions of an air receiving refrigerating compartment, said walls having a plurality of refrigerant receiving passages arranged in said walls, a single refrigerant receptacle communicating with the passages in both of the aforesaid spaced and parallel metallic walls whereby refrigerant liquid is supplied to and vaporized refrigerant received from the aforesaid passages in both of said walls, and means associated with said single receptacle for supplying refrigerant liquid to and for exhausting vaporized refrigerant from the latter.

34. The combination with a refrigerator cooled by circulation of air internally thereof, of a refrigerant evaporating unit disposed internally of said refrigerator in direct heat exchanging relation with said circulating air, said refrigerant evaporating unit comprising a refrigerating compartment disposed both internally and externally in heat exchanging relation with said circulating air and having a spaced pair of unitary side portions for preventing circulation of air therethrough between the interior and exterior of said compartment, said side portions having a plurality of communicating refrigerant conveying ducts wherein heat is absorbed by refrigerant fluid directly from the air both interiorly and exteriorly of said compartment, and means for supplying refrigerant liquid to and for exhausting refrigerant vapor from said ducts.

35. A refrigerating apparatus comprising a heat insulated cabinet arranged for the circulation of air internally thereof, a refrigerant evaporing unit disposed within said cabinet and so constructed and arranged as to divide the latter into a plurality of refrigerating compartments, said evaporating unit comprising a substantially planular solid metallic wall having passages formed internally thereof for the distribution and evaporation of refrigerant liquid, the opposite sides of said planular solid metallic wall being so positioned as to absorb heat from different refrigerating compartments, means associated with one side of said planular metallic wall for substantially increasing the heat absorbing surface thereof, means for supplying refrigerant liquid to said passages in said wall, and a refrigerant condensing unit for exhausting and condensing the fluid evaporated in said passages.

36. In refrigeration apparatus, a refrigerant expansion unit comprising a liquid refrigerant evaporator, and a plurality of parallel rows of fins connected in thermal contact with said evaporator, said fins in said rows being arranged in staggered relation to the fins in the adjacent row.

37. A refrigerating apparatus comprising a heat insulated cabinet arranged for the circulation of air internally thereof, a refrigerant evaporating unit disposed within said cabinet and so constructed and arranged as to divide the latter into a plurality of refrigerating compartments, said evaporating unit comprising a substantially planular solid metallic wall having imperforate side portions, one of said side portions being irregular in cross sectional configuration and embracing depressions extending inwardly of the wall and integrally united with the other side portion for increasing the heat transfer surface of the wall and providing between the said side portions a plurality of passages formed internally of the wall for the distribution and evaporation of refrigerant liquid, the opposite sides of said planular solid metallic wall being so positioned as to absorb heat from different refrigerating compartments, means for supplying refrigerant liquid to said passages in said wall, and a refrigerant condensing unit for exhausting and condensing the fluid evaporated in said passages.

38. A refrigerating apparatus comprising a heat insulated cabinet arranged for the circulation of air internally thereof, a refrigerant evaporating unit disposed within said cabinet and so constructed and arranged as to divide the latter into a plurality of refrigerating compartments, said evaporating unit comprising a substantially planular solid metallic wall having imperforate side portions, one of said side portions being irregular in cross sectional configuration and embracing depressions extending inwardly of the wall and integrally united with the other side portion for increasing the heat transfer surface of the wall and providing between the said side portions a plurality of passages formed internally of the wall for the distribution and evaporation of refrigerant liquid, the opposite sides of said planular solid metallic wall being so positioned as to absorb heat from different refrigerating compartments, means comprising a reservoir for supplying refrigerant liquid to said passages in said wall, and a refrigerant condensing unit for exhausting and condensing the fluid evaporated in said passages.

39. A refrigerating apparatus comprising a heat insulated cabinet arranged for the circulation of air internally thereof, a refrigerant evaporating unit disposed within said cabinet and so constructed and arranged as to divide the latter into a plurality of refrigerating compartments, said evaporating unit comprising a pair of parallel substantially planular solid metallic walls each having a plurality of imperforate side portions, one of said side portions included in each wall being irregular in cross sectional configuration and embracing depressions extending inwardly of the wall and integrally united with the other side portion of each wall for increasing the heat transfer surface of the walls and providing between the said side portions a plurality of passages formed internally of the walls for the distribution and evaporation of refrigerant liquid, the opposite sides of each of said planular solid metallic walls being so positioned as to absorb heat from different refrigerating compartments, means for supplying refrigerant liquid to said passages in said walls, and a refrigerant condensing unit for exhausting and condensing the fluid evaporated in said passages.

In testimony whereof I hereunto affix my signature.

JOHN R. REPLOGLE.